*US009113101B2*

United States Patent
Negishi (10) Patent No.: US 9,113,101 B2
(45) Date of Patent: Aug. 18, 2015

(54) IMAGE SENSOR AND IMAGE CAPTURING SYSTEM

(71) Applicant: CANON KABUSHIKI KAISHA, Tokyo (JP)

(72) Inventor: Norio Negishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 13/929,168

(22) Filed: Jun. 27, 2013

(65) Prior Publication Data

US 2014/0009635 A1 Jan. 9, 2014

(30) Foreign Application Priority Data

Jul. 5, 2012 (JP) .................................. 2012-151805

(51) Int. Cl.
*H04N 5/378* (2011.01)
*H04N 5/3745* (2011.01)

(52) U.S. Cl.
CPC ........... *H04N 5/378* (2013.01); *H04N 5/37457* (2013.01)

(58) Field of Classification Search
None
See application file for complete search history.

(56) References Cited

U.S. PATENT DOCUMENTS

| 7,777,170 | B2* | 8/2010 | Murakami et al. ............ 341/169 |
| 8,093,543 | B2* | 1/2012 | Yamaoka et al. .......... 250/214 R |
| 2005/0253942 | A1* | 11/2005 | Muramatsu et al. .......... 348/273 |
| 2006/0012698 | A1* | 1/2006 | Nitta et al. .................... 348/308 |
| 2007/0046795 | A1* | 3/2007 | Yamashita .................... 348/294 |
| 2008/0170137 | A1* | 7/2008 | Matsumoto et al. .......... 348/241 |
| 2010/0033362 | A1* | 2/2010 | Kitami .......................... 341/169 |
| 2010/0277632 | A1* | 11/2010 | Murakami et al. ............ 348/297 |
| 2010/0309356 | A1* | 12/2010 | Ihara et al. .................... 348/300 |
| 2011/0141324 | A1* | 6/2011 | Koseki .......................... 348/241 |
| 2011/0205097 | A1* | 8/2011 | Asayama et al. ............. 341/145 |
| 2012/0113286 | A1* | 5/2012 | Lim et al. ................... 348/222.1 |
| 2014/0211055 | A1* | 7/2014 | Wakabayashi et al. ....... 348/302 |

FOREIGN PATENT DOCUMENTS

| JP | 2001-346106 A | 12/2001 |
| JP | 2005-348325 A | 12/2005 |

* cited by examiner

*Primary Examiner* — Jason Flohre
(74) *Attorney, Agent, or Firm* — Cowan, Liebowitz & Latman, P.C.

(57) ABSTRACT

An image sensor in which a plurality of pixels are arrayed in a row direction and a column direction, and an A/D converter is provided on each column of the plurality of pixels. The A/D converter performs one of charge and discharge from an initial value which is a voltage corresponding to an output signal from a pixel, outputs, as a digital value of the output signal, a value corresponding to a time taken for the voltage to become higher or lower than a predetermined reference voltage, and changes one of an amount of charge and an amount of discharge per unit time according to a possible value of the output signal.

8 Claims, 12 Drawing Sheets

| SENSITIVITY SETTING | FIXED VOLTAGE | RESISTANCE VALUE |
|---|---|---|
| SENSITIVITY SETTING 1 | V_DE2 | R2 |
| SENSITIVITY SETTING 2 | V_DE3 | R3 |
| SENSITIVITY SETTING 3 | V_DE4 | R4 |
| SENSITIVITY SETTING 4 | V_DE5 | R5 |

F I G. 10

| SENSITIVITY SETTING | FIXED VOLTAGE | RESISTANCE VALUE |
|---|---|---|
| SENSITIVITY SETTING 1 | V_DE5 | R5 |
| SENSITIVITY SETTING 2 | V_DE4 | R4 |
| SENSITIVITY SETTING 3 | V_DE3 | R3 |
| SENSITIVITY SETTING 4 | V_DE2 | R2 |

IMAGE SENSOR AND IMAGE CAPTURING SYSTEM

BACKGROUND OF THE INVENTION

1. Field of the Invention

The present invention relates to an image sensor and an image capturing system.

2. Description of the Related Art

In recent years, an image sensor including a complicated analog circuit, digital circuit, and signal processing circuit has been developed by combining a CMOS logic manufacturing process with an image sensor manufacturing process. For example, there is known an image sensor in which a plurality of pixels are two-dimensionally arrayed in the row and column directions and which incorporates an analog/digital converter (A/D converter).

As an image sensor including an A/D converter, there is known an arrangement in which an A/D converter is provided on each pixel column (column parallel type A/D conversion). With this arrangement, it is possible to decrease the conversion rate of the A/D converter to a readout rate for one row, thereby reducing the operation speed of the A/D converter, as compared with a case in which an A/D converter is provided outside an image sensor. This can reduce the power consumption, and also readily increase the readout rate from the image sensor.

As such image sensor including column parallel type A/D converters, an image sensor is known, which converts a pixel value into a digital value by counting, when discharging or charging the output voltage of a pixel, a time until a reference voltage is reached (Japanese Patent Laid-Open No. 2005-348325).

Figure 13:
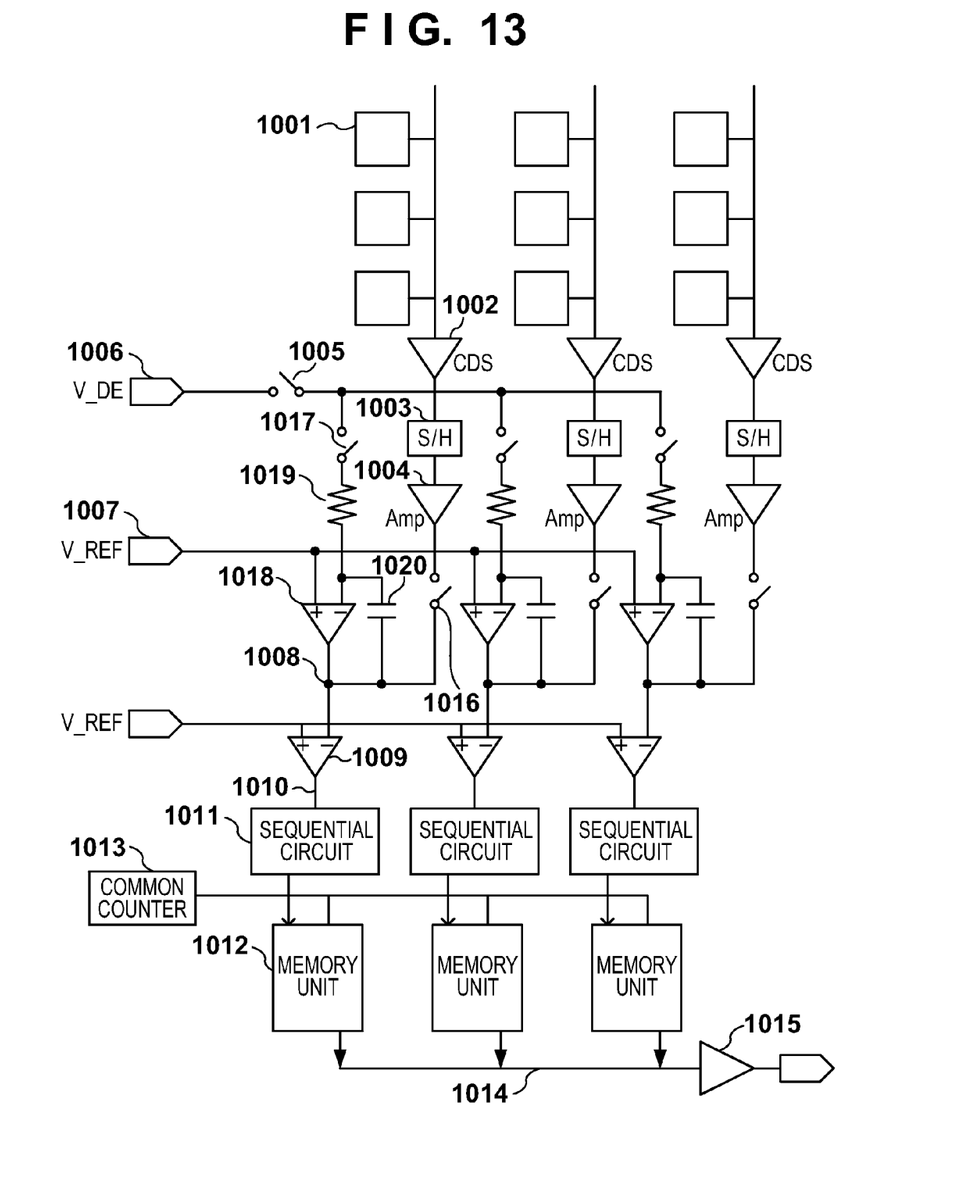
FIG. 13 is a circuit diagram showing the arrangement of an image sensor according to a conventional example.
Figure 14:
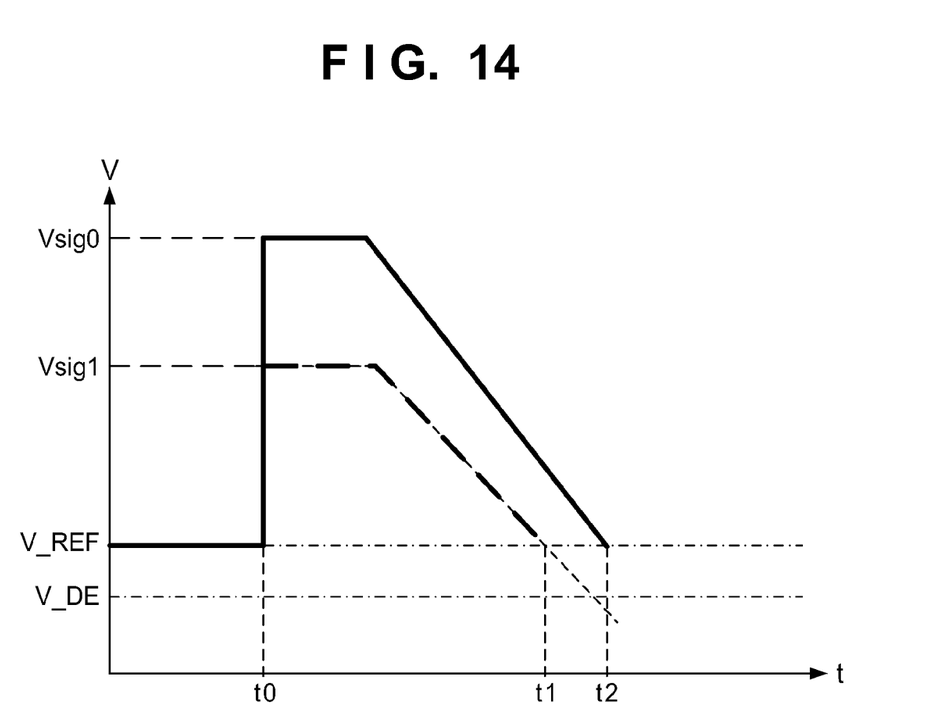
FIG. 14 is a timing chart showing an example of the operation of the image sensor according to the conventional example.

This conventional technique will be described with reference to FIGS. 13 and 14. FIG. 13 is a circuit diagram showing an example of the circuit arrangement of an image sensor including column parallel type A/D converters. FIG. 14 is a timing chart showing a temporal change in output level of an integrator 1018 shown in FIG. 13.

Referring to FIG. 13, a pixel 1001 includes a photoelectric conversion element. A signal output from the pixel 1001 is connected to an output terminal 1008 of the integrator 1018 via a correlation double sampling (CDS) circuit 1002, a sample/hold (S/H) circuit 1003, a column amplifier 1004, and a switch 1016. A fixed voltage V_DE is applied from a terminal 1006 to the input terminal (−) of the integrator 1018 via a switch 1005, a resistance 1019, and a switch 1017. A reference voltage V_REF is applied from a terminal 1007 to the other input terminal (+) of the integrator 1018. Assume that the fixed voltage V_DE is lower than the reference voltage V_REF.

The integrator 1018 has a time constant based on the resistance 1019 and a capacitor 1020. A comparator 1009 compares the voltage of the output terminal 1008 with the reference voltage V_REF. A trigger output 1010 of the comparator 1009 controls the data load timing of a memory unit 1012 via a sequential circuit 1011. The count output of a common counter 1013 is connected to the input terminal of the memory unit 1012.

The operation of the image sensor shown in FIG. 13 will be described with reference to the timing chart shown in FIG. 14. The switch 1016 is turned on, and a signal voltage Vsig1 from the column amplifier 1004 is held in the output terminal 1008 of the integrator 1018 at a time t0. The switch 1016 is then turned off, and the switches 1005 and 1017 are turned on. Upon turning on the switch 1017, the common counter 1013 starts counting.

The fixed voltage V_DE lower than the reference voltage V_REF is applied to the resistance 1019 via the switches 1005 and 1017. As a result, the integrator 1018 starts discharge toward the fixed voltage V_DE as a discharge end voltage with a negative slope determined according to the time constant based on the resistance 1019 and capacitor 1020. The voltage of the output terminal 1008 of the integrator 1018 becomes lower than the reference voltage V_REF at a time t1, and the comparator 1009 generates the trigger output 1010. At this time, the memory unit 1012 is selected by the trigger output, and the value of the common counter 1013 is loaded into the memory unit 1012. Furthermore, the trigger output 1010 causes the sequential circuit 1011 to operate, and the switch 1017 is turned off, thereby terminating discharge. The output signal of the memory unit 1012 is connected to a common horizontal output line 1014. After one memory unit 1012 is selected, the output signal of the selected memory unit 1012 is digitally output to the outside via an amplifier 1015. There has been proposed a technique which enables switching of a dynamic range by changing a reference voltage to be applied to a column parallel type A/D converter according to the strength of a pixel signal (Japanese Patent Laid-Open No. 2001-346106).

In the above-described conventional techniques, however, it takes a longer time to reach the reference voltage as the initial signal voltage is higher, thereby prolonging the time required for A/D conversion. This will be described with reference to FIG. 14. If a signal voltage is Vsig1, the time required for A/D conversion is a time t1−t0, as indicated by a thick dotted line. If, however, a signal voltage is Vsig0 higher than Vsig1, the time required for A/D conversion is a time t2−t0, which is longer by t2−t1.

If, for example, there is a mode in which a readout operation is performed by adding pixel signals as a readout mode of the image sensor, a signal voltage in this mode is higher than that in a mode in which a readout operation is performed without adding pixel signals. In the mode in which a readout operation is performed by adding pixel signals, therefore, the time required for A/D conversion is longer than that in the normal readout mode in which no pixel signals are added.

SUMMARY OF THE INVENTION

The present invention has been made in consideration of the aforementioned problems of the conventional techniques, and provides an image sensor which includes column parallel type A/D converters and suppresses an increase in time required for A/D conversion even if a signal voltage becomes higher as in a case wherein pixel signals are added.

The first aspect of present invention provides an image sensor in which a plurality of pixels are arrayed in a row direction and a column direction, and an A/D converter is provided on each column of the plurality of pixels, wherein the A/D converter performs one of charge and discharge from an initial value which is a voltage corresponding to an output signal from a pixel, outputs, as a digital value of the output signal, a value corresponding to a time taken for the voltage to become higher or lower than a predetermined reference voltage, and changes one of an amount of charge and an amount of discharge per unit time according to a possible value of the output signal.

The second aspect of the present invention provides an image capturing system comprising above image sensor and a control unit for controlling drive of the image sensor, wherein the control unit controls drive of the image sensor so that one of an amount of charge and an amount of discharge per unit time in an A/D converter is increased as a possible maximum value of an output signal increases.

Further features of the present invention will become apparent from the following description of exemplary embodiments (with reference to the attached drawings).

DESCRIPTION OF THE EMBODIMENTS (First Embodiment)

The first embodiment of the present invention will be described below with reference to the accompanying drawings. Note that in this embodiment and subsequent embodiments, switches and operation amplifiers are modeled, unless otherwise needed. Furthermore, switches necessary for operations in their peripheries are omitted, unless otherwise needed. The present invention is not limited to the embodiments to be described below, as a matter of course.

Figure 4:
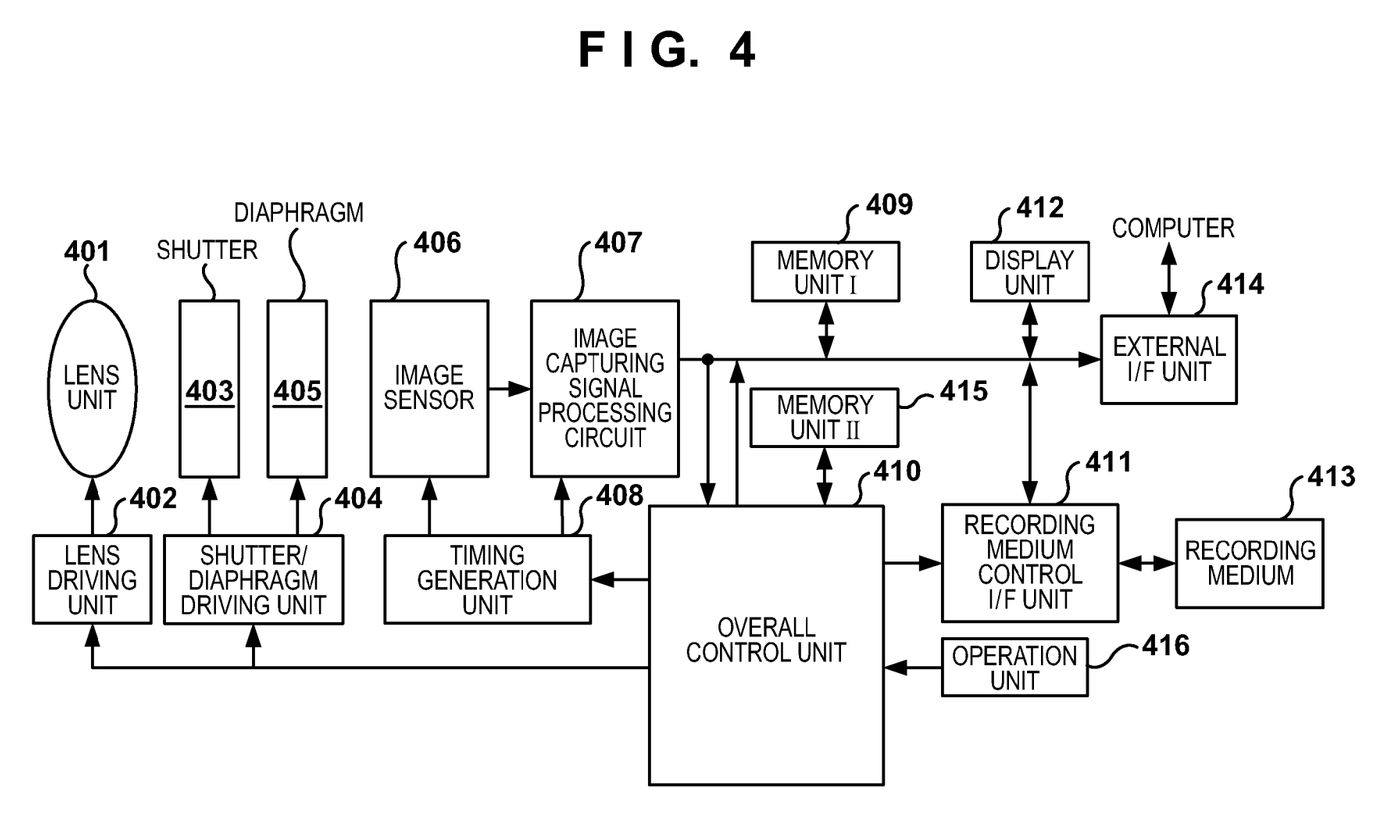
FIG. 4 is a block diagram showing the system configuration of an image capturing apparatus according to an embodiment of the present invention.

FIG. 4 shows an overview of an image capturing system using an image sensor. The image capturing system includes an optical system with a lens unit 401, a lens driving unit 402, a shutter 403, a shutter/diaphragm driving unit 404, a diaphragm 405, and the like, and an image sensor 406. The image sensor 406 incorporates circuits for performing correlation double sampling, gain adjustment, and A/D conversion. Furthermore, the image capturing system includes an image capturing signal processing circuit 407, a timing generation unit 408, a memory unit 1409, an overall control unit 410, a recording medium control I/F unit 411, a display unit 412, a recording medium 413, an external I/F unit 414, a memory unit II 415, and an operation unit 416.

After passing through the lens unit 401, an object image is adjusted to an appropriate amount of light by the diaphragm 405, and formed on the image sensor 406. The light enters the image sensor 406 as an object image, and is photoelectrically converted into an electric signal in the image sensor 406. The electric signal undergoes correlation double sampling, gain adjustment, conversion from an analog signal into a digital signal in the CDS circuit and A/D conversion circuit incorporated in the image sensor 406, and is output as a digital signal to the image capturing signal processing circuit 407. The image capturing signal processing circuit 407 executes various image signal processes such as low-pass filter processing for reducing noise, shading correction, white balance (WB) processing, and also executes various correction operations, image data compression, and the like.

The lens driving unit 402 controls drive of lens unit 401 such as zooming and focusing. The shutter/diaphragm driving unit 404 controls drive of the shutter 403 and diaphragm 405. The timing generation unit 408 outputs control signals for gain setting and driving timing control of the image sensor 406 to the image sensor 406 and image capturing signal processing circuit 407 based on a control signal from the overall control unit 410. The overall control unit 410 controls the whole image capturing apparatus, and performs various calculation operations. The memory unit I 409 temporarily stores image data. The recording medium control I/F unit 411 records or reads out image data in or from the recording medium 413. The display unit 412 displays image data. The recording medium 413 is a detachable storage medium such as a semiconductor memory for recording or reading out image data. The external I/F unit 414 serves as an interface for communicating with an external computer or the like. The memory unit II 415 stores a calculation result by the overall control unit 410. Information about image capturing apparatus driving conditions set by the user using the operation unit 416 is sent to the overall control unit 410, which then controls the whole image capturing apparatus based on the information.

Figure 3:
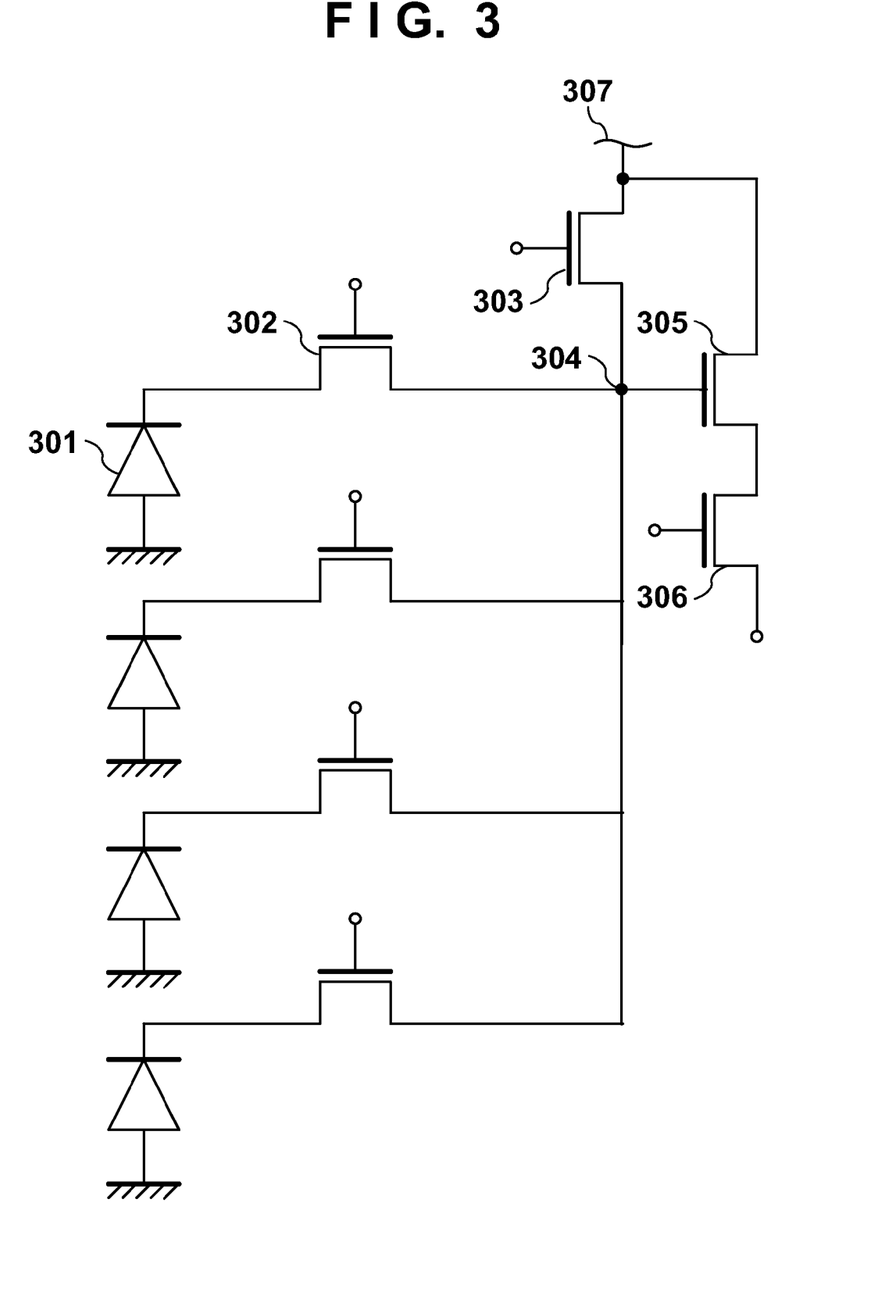
FIG. 3 is a circuit diagram showing the arrangement of a pixel according to the present invention.

FIG. 3 shows the structure of the pixel of the image sensor 406. A photodiode (PD) 301 converts incident light into signal charges. The signal charges generated by the PD 301 are transferred to a floating diffusion (FD) 304 by a transfer switch 302, and temporarily accumulated in the FD 304. The FD 304, an amplifier 305, and a constant-current source 307 constitute a floating diffusion amplifier. The signal charges accumulated in the FD 304 selected by a selection pulse given to the gate of a selection switch 306 are converted into a voltage, and output to a CDS circuit 101 via a signal output line, readout circuit, and amplifier. A plurality of pixels arrayed in the row and column directions constitute an image sensor.

The image sensor according to the embodiment has an arrangement which enables a plurality of PDs 301 to share the FD 304. In a readout mode (pixel addition readout mode) in which pixel signals are added, it is possible to add, in the FD 304, charges from the plurality of PDs 301 by simultaneously reading out the charges from the plurality of PDs 301 by the transfer switches 302 into the FD 304.

Figure 1:
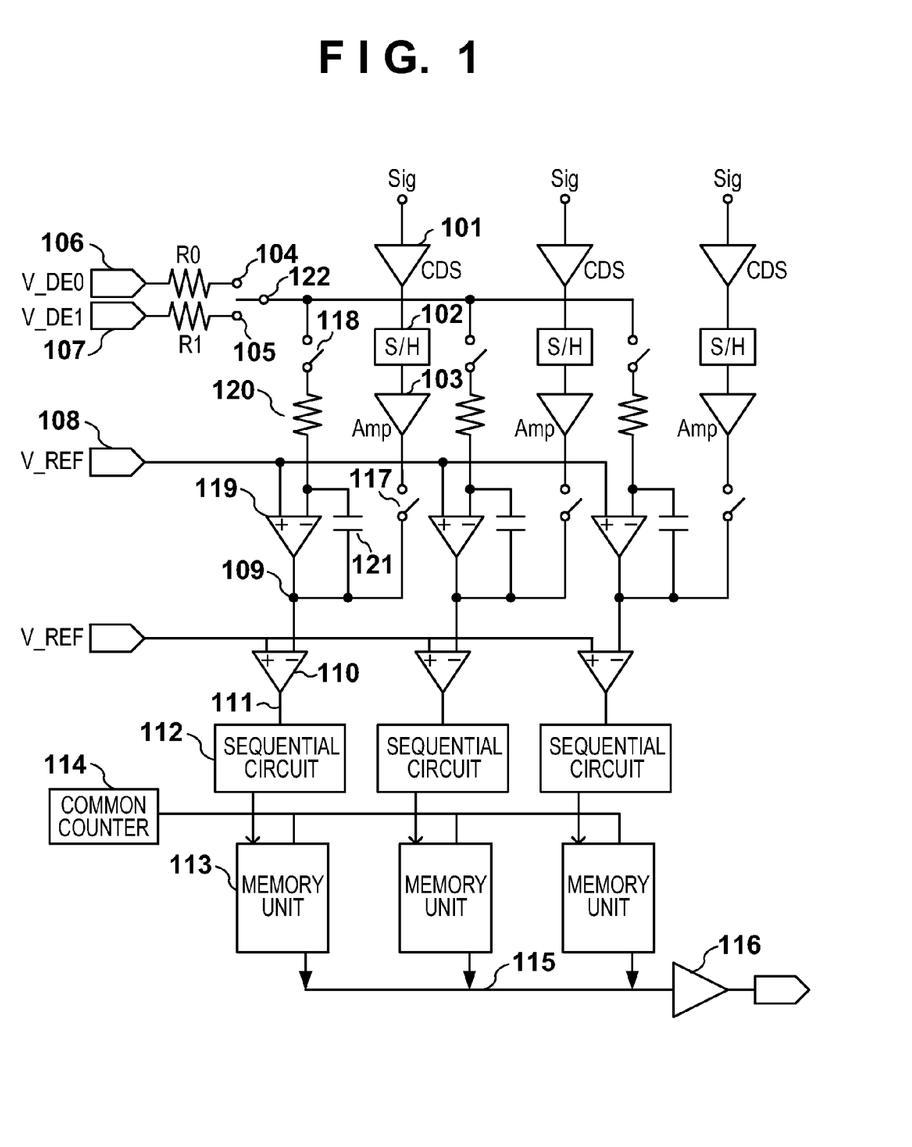
FIG. 1 is a circuit diagram showing the arrangement of an image sensor according to the first embodiment of the present invention.

An arrangement of subsequent stage of the CDS circuit of the image sensor will be described with reference to FIG. 1. A signal from each pixel is connected to an output terminal 109 of an integrator 119 via the CDS (correlation double sampling) circuit 101, a sample/hold (S/H) circuit 102, a column amplifier 103, and a switch 117, all of which are provided on each column. By switching a switch 122, a fixed voltage V_DE0 or V_DE1 is applied from a terminal 106 or 107 to a switch 118 via a resistance R0 or R1 having a different resistance value. The fixed voltage V_DE0 or V_DE1 is input to the input terminal (−) of the integrator 119 via the switch 118 and a resistance 120. A reference voltage V_REF is applied from a terminal 108 to the other input terminal (+) of the integrator 119. The fixed voltages V_DE0 and V_DE1 have potentials lower than that of the reference voltage V_REF of the integrator, and have a relationship V_DE0≤V_DE1. The resistances R0 and R1 have a relationship R0≤R1. Note that V_DE0, V_DE1, R0, and R1 are set not to satisfy a condition that V_DE0=V_DE1 and R0=R1.

The integrator 119 has a time constant based on the resistance R0 or R1, the resistance 120, and a capacitor 121. A comparator 110 compares the voltage of the output terminal 109 of the integrator 119 with the reference voltage V_REF. A trigger output 111 from the comparator 110 controls the data load timing of a memory unit 113 via a sequential circuit 112. The count output of a common counter 114 is connected to the input of the memory unit 113. Upon generating the trigger output 111, the memory unit 113 is selected, and the count value of the common counter 114 is loaded into the selected memory unit 113.

The output signal of the memory unit 113 is connected to a common horizontal output line 115. After one memory unit is selected, the output of the selected memory unit 113 is digitally output to the outside via an amplifier 116.

There are various implementation methods of selectively outputting a signal from the memory unit 113 to the common horizontal output line 115. For example, a terminal for selecting a memory unit is provided on the image sensor side, and an ON signal is externally sent to the terminal of a memory unit to be selected. Alternatively, to decrease the number of terminals for selecting a memory unit, an encoded selection signal is serially sent to the image sensor, and the image sensor decodes the signal to select a memory unit. Furthermore, a timing signal is externally sent, and an ON signal is shifted by one column, thereby selecting a memory unit.

Figure 2:
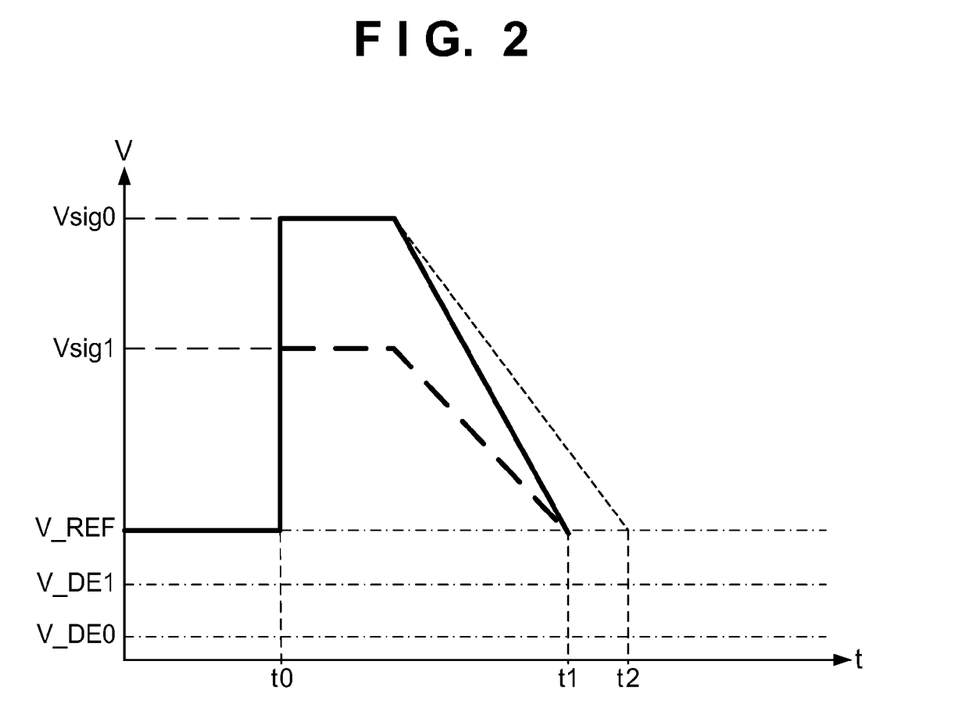
FIG. 2 is a timing chart showing an example of the operation of the image sensor according to the first embodiment of the present invention.

An operation according to the embodiment shown in FIG. 1 will be described with reference to FIG. 2. Referring to FIG. 2, the ordinate represents the output level of the integrator 119, and the abscissa represents time. A thick dotted line indicates an example of an operation in a mode (normal readout mode) in which a readout operation is performed without pixel addition. A solid line indicates an example of an operation in the pixel addition readout mode in which a readout operation is performed by adding pixel signals by two pixels. To add pixel signals in the pixel addition readout mode, the FD 304 may add charges generated by the PDs 301 of three or more pixels. A series of A/D conversion operations in the image sensor 406 is performed based on a driving timing control signal sent from the timing generation unit 408 to the image sensor 406 according to a control signal sent from the overall control unit 410 to the timing generation unit 408.

A case in which the image sensor 406 is driven in the normal readout mode will first be explained. The switch 117 is turned on, and a signal voltage Vsig1 of the pixel is held as an initial value in the output terminal 109 of the integrator 119 at a time t0. The switch 117 is then turned off, the switch 122 selects a terminal 105, and the switch 118 is turned on. Upon turning on the switch 118, the common counter 114 starts counting, and the integrator 119 starts discharge with a negative slope toward the fixed voltage V_DE1. The output of the integrator 119 becomes lower than the reference voltage of the comparator 110 at a time t1. At this time, the count value of the common counter 114 is loaded into the memory unit 113. After the count value is loaded, the output of the sequential circuit 112 turns off the switch 118, thereby terminating discharge. In this way, values A/D converted in a column parallel manner are stored in the corresponding memory units 113, respectively. After that, the memory units 113 are sequentially selected, from each of which a digital signal from the pixel is read out. Although the operation by discharge has been described, a negative pixel signal may be charged with a positive slope until the reference voltage is exceeded.

A case in which the image sensor 406 is driven in the pixel addition readout mode will be described by exemplifying two-pixel addition. In the pixel addition readout mode, by turning on the transfer switches 302 of two pixels shown in FIG. 3 at once, charges in two PDs 301 are accumulated in the FD 304, and a voltage signal corresponding to the accumulated charges is output via the amplifier 305. The output signal voltage for the two pixels is applied to the switch 117 via the CDS circuit 101, sample/hold circuit 102, and column amplifier 103. If the switch 117 is turned on at this time, the voltage of the output terminal 109 of the integrator 119 at the time t0 is held, as an initial value, at the signal voltage Vsig0 for the two pixels. The switch 117 is then turned off, the switch 122 selects a terminal 104, and the switch 118 is turned on. Upon turning on the switch 118, the common counter 114 starts counting, and the integrator 119 starts discharge with a negative slope toward the fixed voltage V_DE0. The output of the integrator 119 becomes lower than the reference voltage of the comparator 110 at the time t1. At this time, the count value of the common counter 114 is loaded into the memory unit 113, thereby terminating A/D conversion. At the end of A/D conversion, the output of the sequential circuit 112 turns off the switch 118, thereby terminating discharge. The common counter 114 counts until A/D conversion for one row is completed or until a full count is reached.

If the time constant of the integrator and the fixed voltage as a discharge end voltage selected by the switch 122 are the same between the mode with pixel addition and the mode without pixel addition, the discharge slope is also the same. Therefore, when pixel addition is performed, discharge ends at a time t2. In this example, however, the integration time constant based on the resistances R0 and 120 and capacitor 121, and the fixed voltage V_DE0 are set to be different from the time constant based on the resistances R1 and 120 and capacitor 121, and the fixed voltage V_DE1, respectively. The slope of discharge in the pixel addition readout mode is set to be steeper than that in the mode without pixel addition. Even in the pixel addition readout mode, the A/D conversion end time can be t1, and the time required for A/D conversion can be shortened by t2−t1, similarly to the normal readout mode without pixel addition. The weight of the count value is different between the normal readout mode and the pixel addition readout mode. The image capturing signal processing circuit corrects a digital value output from the image sensor according to switching between the modes, as needed.

As described above, the resistance value of a time constant circuit and a fixed voltage value set in an integration circuit are switched so that the amount of charge or discharge per unit time becomes larger as the number of pixels to be added in a readout operation increases. It is possible to shorten the time required for A/D conversion in the pixel addition readout mode by changing the amount of charge or discharge per unit time according to a possible range of the voltage value of the output signal of the pixel. Note that in the embodiment, the fixed voltages V_DE0 and V_DE1 and the resistances R0 and R1 are set so that the time required for A/D conversion becomes the same between the mode in which pixel addition is performed and that in which no pixel addition is performed. It is not always necessary to make settings so that A/D conversion is completed within the same time, as a matter of course. It is only necessary to appropriately set the fixed voltages V_DE0 and V_DE1 and resistances R0 and R1 so as to increase the speed of A/D conversion within an allowable range of A/D conversion accuracy.

(Second Embodiment)

A case in which A/D conversion is performed if the sensitivity can be changed will be described. As a method of changing the sensitivity, a digital signal A/D converted in an image sensor is output, and then the signal is digitally amplified according to the sensitivity set by an image capturing signal processing circuit 407 of the succeeding stage. In this case, as the sensitivity is increased, an increase degree of a digital gain becomes larger. In consideration of a maximum value of a digital value which can be processed by digital processing, when the sensitivity is increased, it is necessary to decrease the amplitude of a signal which is output from a column amplifier 103 and input to an A/D converter. To do this, the amplitude of a signal to be input to an integrator is changed according to a sensitivity setting. The user sets the sensitivity through an operation unit 416, and an overall control unit 410 sends a setting signal corresponding to the set sensitivity to an image capturing signal processing circuit 407 via a timing generation unit 408 to set it.

Figure 6:
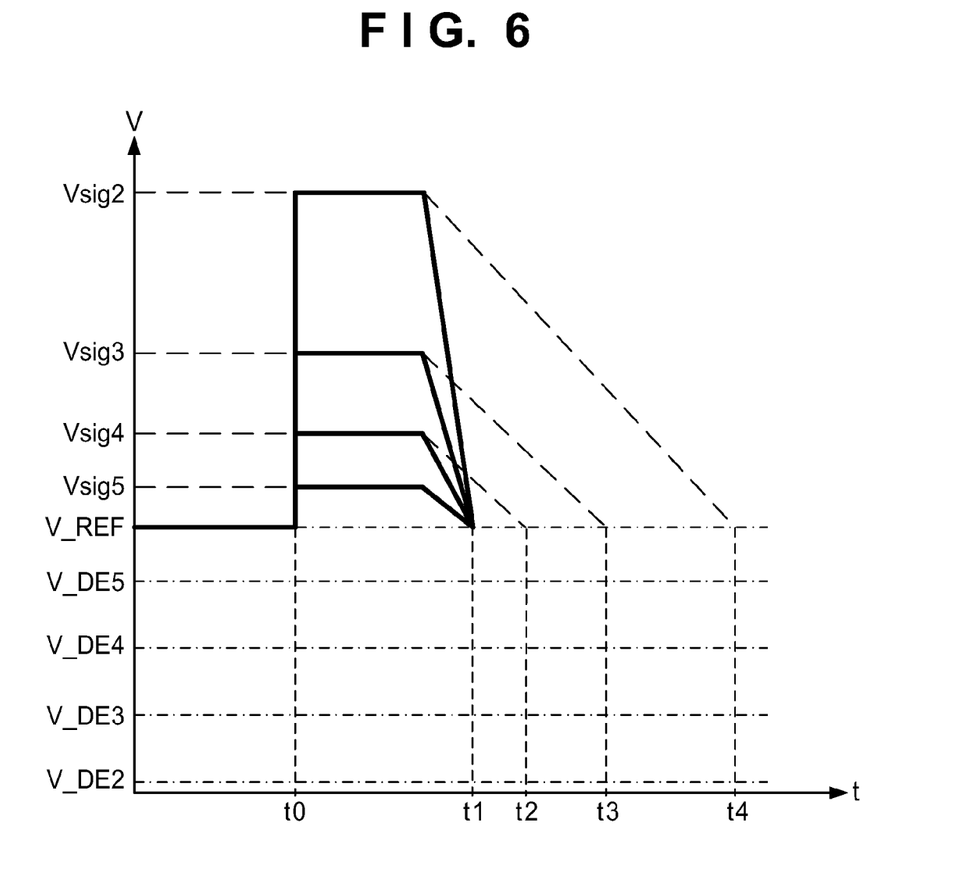
FIG. 6 is a timing chart showing an example of the operation of the image sensor according to the second embodiment of the present invention.
Figure 7:
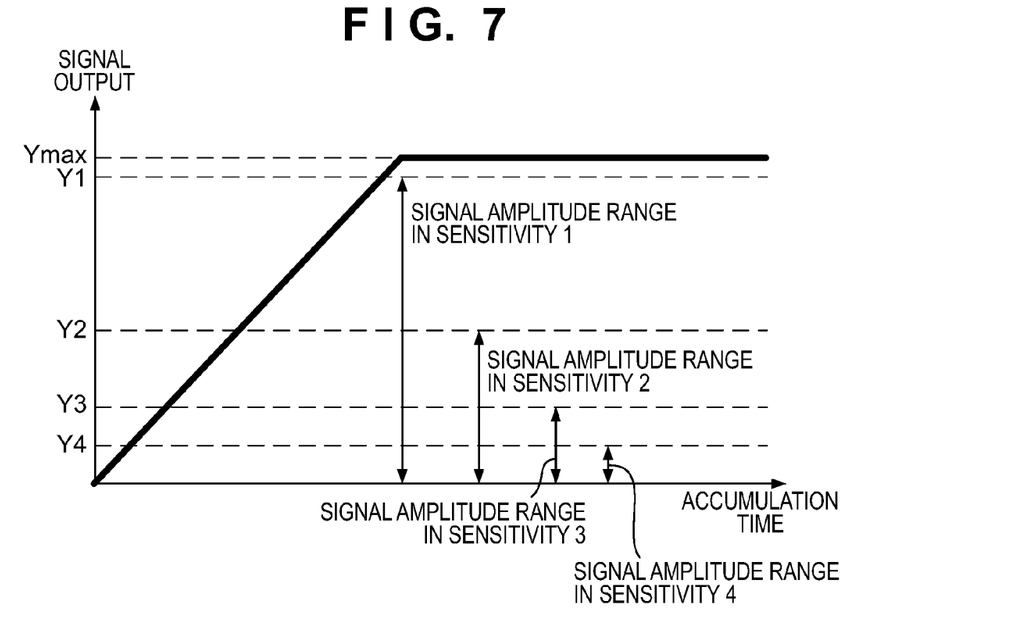
FIG. 7 is a timing chart showing a signal amplitude range used in each sensitivity setting according to the second embodiment of the present invention.

FIG. 7 shows the relationship between the sensitivity setting and the amplitude range of a signal obtained from a PD 301 of the image sensor. The ordinate represents a signal output value in the image sensor and the abscissa represents an accumulation time. Let Ymax be the saturation output of the PD 301. In sensitivity setting 1, the amplification degree in the image capturing signal processing circuit 407 is α, and the maximum amplitude value of the signal is Y1. In this case, in sensitivity setting 2, the amplification degree in the image capturing signal processing circuit 407 is 2×α and the maximum amplitude value of the signal is Y2 which is half the value Y1. Similarly, in sensitivity setting 3, the amplification degree in the image capturing signal processing circuit 407 is 4×α and the maximum amplitude value of the signal is Y3 which is half the value Y2. In sensitivity setting 4, the amplification degree in the image capturing signal processing circuit 407 is 8×α and the maximum amplitude value of the signal is Y4 which is half the value Y3. The amplitude range of the signal widens as the number of sensitivity settings increases. Therefore, if A/D conversion operations are respectively performed using integration circuits with the same slope, the time required for A/D conversion widely varies. In this embodiment, a method of performing A/D conversion which does not cause variations in time required for A/D conversion, regardless of a sensitivity setting used will be described with reference to FIGS. 5 to 10. Note that the arrangement of the image sensor, the system configuration of an image capturing apparatus, and the like are the same as those shown in FIGS. 1 to 4 in the first embodiment, and a description thereof will be omitted.

Figure 5:
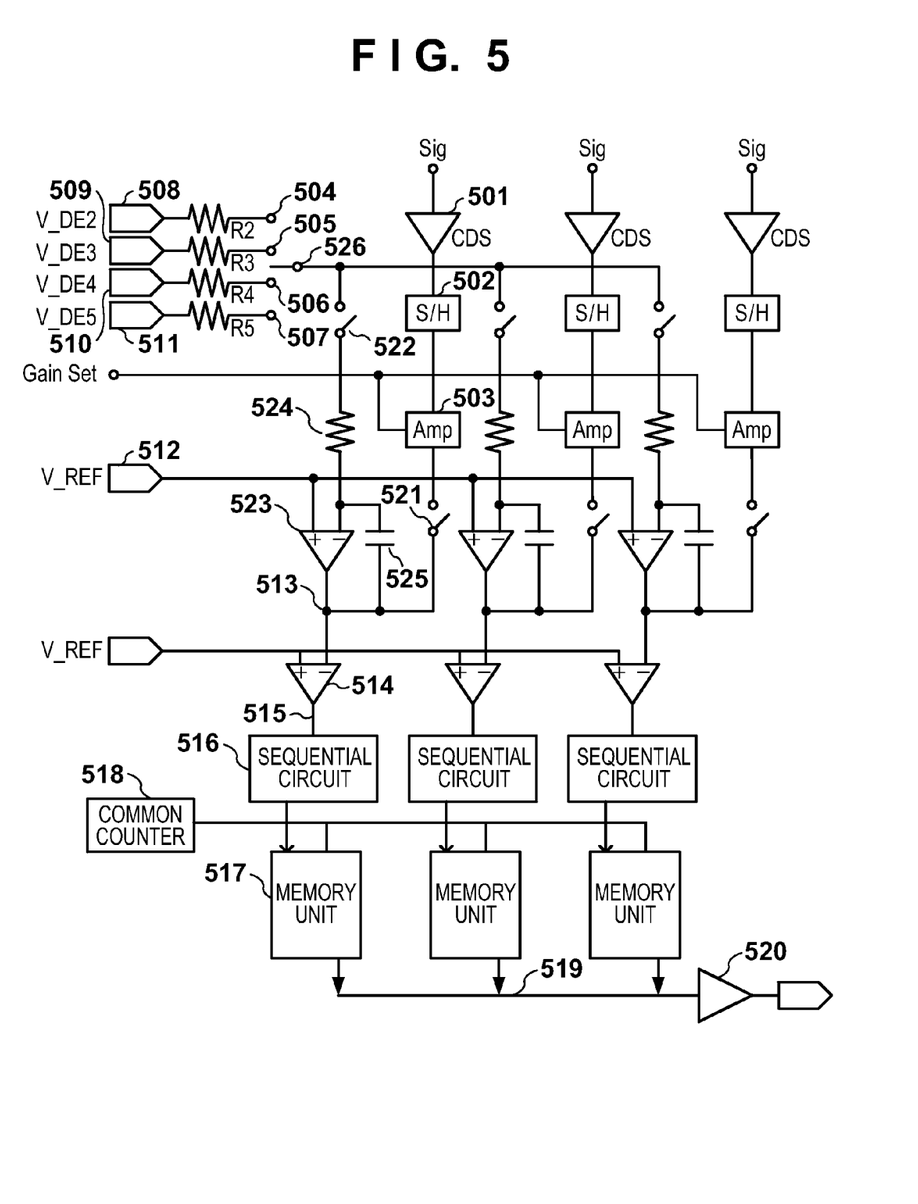
FIG. 5 is a circuit diagram showing the arrangement of an image sensor according to the second embodiment of the present invention.

Referring to FIG. 5, a signal from each pixel is connected to an output terminal 513 of an integrator 523 via a CDS (correlation double sampling) circuit 501, a sample/hold (S/H) circuit 502, a column amplifier 503, and a switch 521. By switching a switch 526, a fixed voltage V_DE2, V_DE3, V_DE4, or V_DE5 is applied from a terminal 508, 509, 510, or 511 to a switch 522 via a resistance R2, R3, R4, or R5 having a different resistance value. When the switch 522 is turned on, one of the fixed voltages V_DE2 to V_DE5 is applied to the input terminal (−) of the integrator 523 via one of the resistances R2 to R5 and a resistance 524. A reference voltage V_REF is applied from a terminal 512 to the other input terminal (+) of the integrator 523.

The fixed voltages V_DE2, V_DE3, V_DE4, and V_DE5 have potentials lower than that of the reference voltage V_REF of the integrator, and have a relationship $V\_DE2 \leq V\_DE3 \leq V\_DE4 \leq V\_DE5$. The resistances R2, R3, R4, and R5 have a relationship $R5 \leq R4 \leq R3 \leq R2$. Note that V_DE2, V_DE3, V_DE4, V_DE5, R2, R3, R4, and R5 are set not to satisfy a condition that $V\_DE2=V\_DE3=V\_DE4=V\_DE5$ and $R2=R3=R4=R5$.

The integrator 523 has a time constant based on the capacitance value of a capacitor 525 and the sum of the fixed 524 and the selected one of the resistances R2 to R5. A comparator 514 compares the voltage of the output terminal 513 of the integrator 523 with the reference voltage V_REF. A trigger output 515 from the comparator 514 controls the data load timing of a memory unit 517 via a sequential circuit 516. The count output of a common counter 518 is connected to the input terminal of the memory unit 517. The output signal of the memory unit 517 is connected to a common horizontal output line 519. After one memory unit is selected, the output of the selected memory unit 517 is digitally output to the outside via an amplifier 520. As described in the first embodiment, various methods can be used as a method of selectively outputting a signal from the memory unit 517 to the common horizontal output line 519.

The operation of the circuit shown in FIG. 5 will be described in combination with FIG. 6. In FIG. 6, the ordinate represents the output level of the integrator and the abscissa represents the time. Note that a series of A/D conversion operations in the image sensor 406 is performed based on a driving timing control signal sent from the timing generation unit 408 to the image sensor 406 according to a control signal sent from the overall control unit 410 to the timing generation unit 408.

If the sensitivity has been set to sensitivity setting 1, the switch 521 is turned on, and the output terminal 513 of the integrator 523 is held at a signal voltage Vsig2 from the pixel at a time t0. The switch 521 is then turned off, the switch 526 selects the fixed voltage V_DE2, and the switch 522 is turned on. Upon turning on the switch 522, the common counter 518 starts counting. The integrator 523 starts discharge with a negative slope determined by the time constant based on the resistances R2 and resistance 524 and the capacitor 525 toward the fixed voltage V_DE2. The output of the integrator 523 becomes lower than the reference voltage V_REF of the comparator 514 at a time t1. At this time, the count value of the common counter 518 is loaded into the memory unit 517, thereby terminating A/D conversion. At the end of A/D conversion, the output of the sequential circuit 516 turns off the switch 522, thereby terminating discharge.

If the sensitivity has been set to sensitivity setting 2, the switch 521 is turned on, and the output terminal 513 of the integrator 523 is held at a signal voltage Vsig3 from the pixel at the time t0. The switch 521 is then turned off, and the switch 526 selects the fixed voltage V_DE3. When the switch 522 is turned on, the fixed voltage V_DE3 is applied to the integrator 523, and the common counter 518 starts counting. The integrator 523 then starts discharge with a negative slope toward the fixed voltage V_DE3. The output of the integrator 523 becomes lower than the reference voltage V_REF of the comparator 514 at the time t1. At this time, the count value of the common counter 518 is loaded into the memory unit 517, thereby terminating A/D conversion. At the end of A/D conversion, the output of the sequential circuit 516 turns off the switch 522, thereby terminating discharge.

Figure 9:
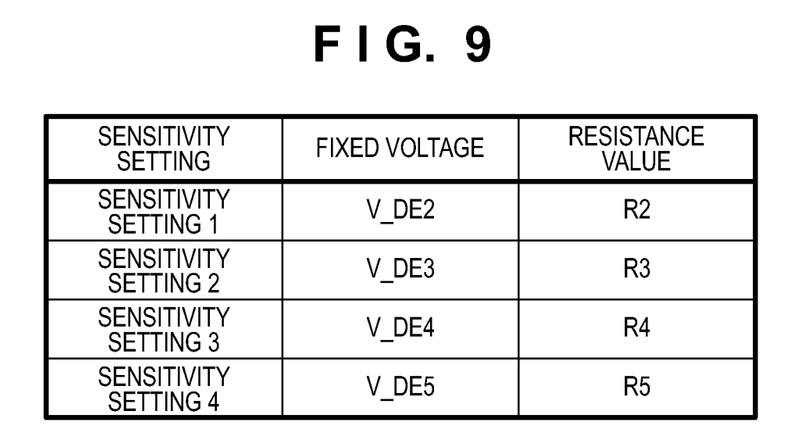
FIG. 9 is a table showing a fixed signal value and resistance value used in each sensitivity setting according to the second embodiment of the present invention.

Similarly, if the sensitivity has been set to sensitivity setting 3, the switch 526 selects the fixed voltage V_DE4. If the sensitivity has been set to sensitivity setting 4, the switch 526 selects the fixed voltage V_DE5 to perform A/D conversion. FIG. 9 shows the relationship between the resistances R2 to R5 and the fixed voltages with respect to the sensitivity set by the operation of the switch 526. It is possible to increase the speed of A/D conversion according to the sensitivity by changing the time constant, based on one of the resistances R2 to R5, the resistance 524, and the capacitor 525, and the corresponding one of the fixed voltages V_DE2 to V_DE5, in accordance with the set sensitivity.

If the same time constant as that in sensitivity setting 4 is used to perform A/D conversion in sensitivity setting 1, 2, or 3, A/D conversion ends at a time t4, t3, or t2. In this embodiment, even if the sensitivity set in an image capturing system is low, the time required for A/D conversion can be t1–t0, similarly to a case in which the set sensitivity is high. This means that it is possible to shorten the time required for A/D conversion by t2–t1, t3–t1, or t4–t1.

In this embodiment, the fixed voltages V_DE2, V_DE3, V_DE4, and V_DE5 and the resistances R2, R3, R4, and R5 are set so that the time required for A/D conversion becomes the same between different sensitivity settings. It is not always necessary to make settings so that A/D conversion is completed within the same time, as a matter of course. It is only necessary to appropriately set the fixed voltages and resistances so as to increase the speed of A/D conversion within an allowable range of A/D conversion accuracy.

In this embodiment, after an output signal from the image sensor is A/D converted, the image capturing signal processing circuit 407 of the subsequent stage changes an amplification factor for digitally amplifying the A/D converted output signal, thereby achieving the set sensitivity. An amplifier of the preceding stage of A/D conversion, for example, the column amplifier 503 may control the gain, thereby achieving the set sensitivity. To set the gain by the column amplifier 503, the overall control unit 410 obtains the sensitivity set by the user through the operation unit 416, and outputs the setting value to the column amplifier 503 in the image sensor 406 via the timing generation unit 408 to set it.

Figure 8:
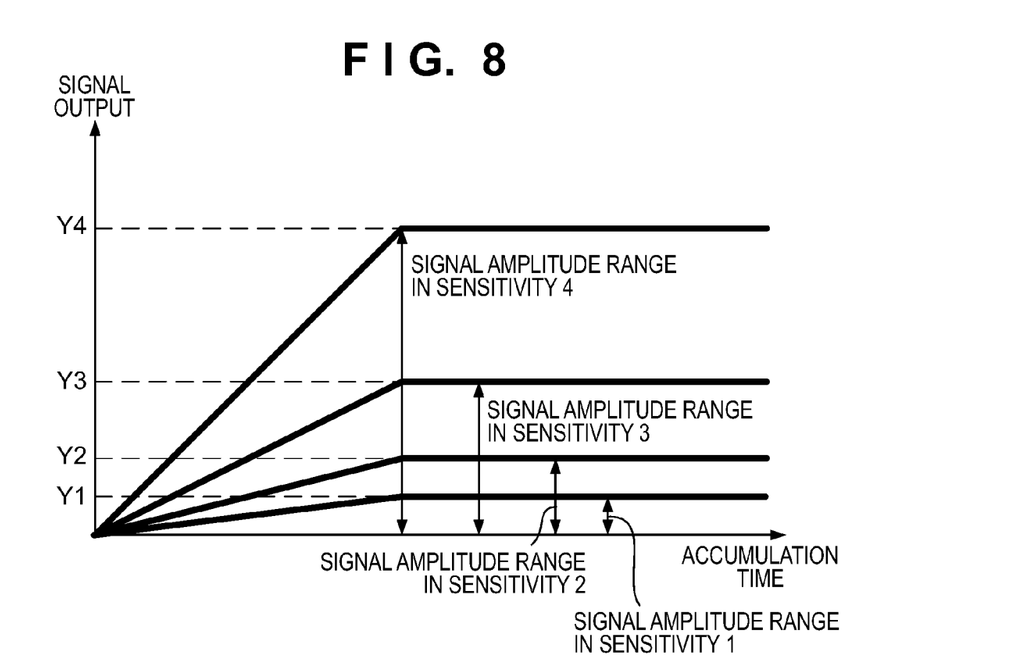
FIG. 8 is a timing chart showing a signal amplitude range used in each sensitivity setting according to the second embodiment of the present invention.

FIG. 8 shows an example of a sensor output and a signal amplitude range used in each sensitivity setting when the preceding stage of A/D conversion controls the gain. The ordinate represents a signal output value before A/D conversion is performed in the image sensor and the abscissa represents an accumulation time. In sensitivity setting 1, $\beta$ represents the amplification degree in the column amplifier 503 and Y1 represents the maximum amplitude value of the signal. In this case, in sensitivity setting 2, the amplification degree in the column amplifier 503 is $2\times\beta$ and the maximum amplitude value of the signal is Y2 which is twice the value Y1. Similarly, in sensitivity setting 3, the amplification degree in the column amplifier 503 is $4\times\beta$ and the maximum amplitude value of the signal is Y3 which is twice the value Y2. In sensitivity setting 4, the amplification degree in the column amplifier 503 is $8\times\beta$ and the maximum amplitude value of the signal is Y4 which is twice the value Y3.

Figure 10:
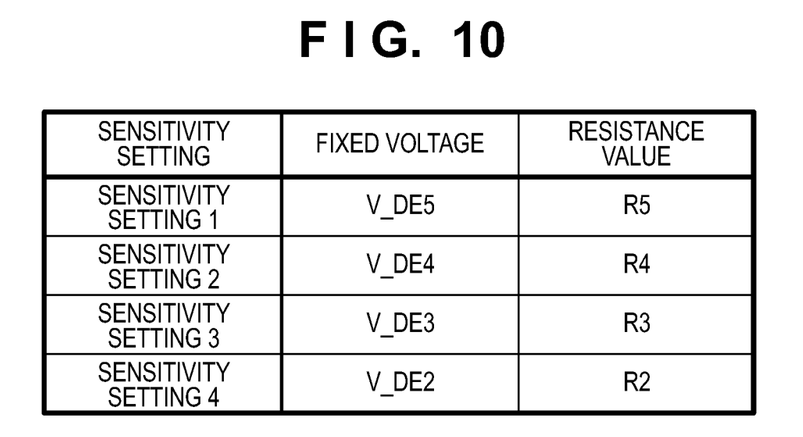
FIG. 10 is a table showing a fixed signal value and resistance value used in each sensitivity setting according to the second embodiment of the present invention.

In this case, similarly to the embodiment in which the image capturing signal processing circuit 407 digitally amplifies a digital signal from the image sensor to set the sensitivity, the set sensitivity becomes higher in the order of sensitivity setting 4, sensitivity setting 3, sensitivity setting 2, and sensitivity setting 1. In contrast to the aforementioned embodiment, the amplitude range of a signal to be A/D converted becomes wider in the order of sensitivity setting 4, sensitivity setting 3, sensitivity setting 2, and sensitivity setting 1. In this case, A/D conversion is performed by selecting V_DE2 for sensitivity setting 4, V_DE3 for sensitivity setting 3, V_DE4 for sensitivity setting 2, and V_DE5 for sensitivity setting 1. FIG. 10 shows the relationship between the resistances R2 to R5 and the fixed voltages with respect to the set sensitivity.

As described above, in the embodiment, even if different sensitivity settings are made in the image capturing system including column parallel type A/D converters, it is possible to decrease a change in time required for A/D conversion by switching the fixed voltage and resistance according to the sensitivity set in the image capturing system.

(Third Embodiment)

In an image capturing system including column parallel type A/D converters, there is a trade-off between the conversion time required for A/D conversion and A/D conversion accuracy for one signal generally. That is, as the A/D conversion time is shorter, the A/D conversion accuracy tends to decrease.

In the first and second embodiments, even if the signal amplitude range to handle A/D conversion is wide, it is possible to perform A/D conversion at high speed, similarly to a case in which the signal amplitude range is narrow. However, if the signal amplitude range is wide (the maximum voltage of an output signal is large or the sensitivity is high), the digital value per unit time (resolution) is larger than that in the normal state, thereby decreasing the A/D conversion accuracy. To solve this problem, in the third embodiment, a method in which even if the signal amplitude range is wide, A/D conversion is performed at high speed and the same A/D conversion accuracy as that when the signal amplitude range is narrow is obtained. In the third embodiment, a case wherein an image sensor is driven in a mode in which no pixel addition is performed and a case wherein the image sensor is driven in a mode in which 2-pixel addition is performed will be exemplified, as in the first embodiment. Note that the arrangement of the image sensor, the system configuration of an image capturing apparatus, and the like are the same as those shown in FIGS. 3 and 4 in the first embodiment, and a description thereof will be omitted.

Figure 11:
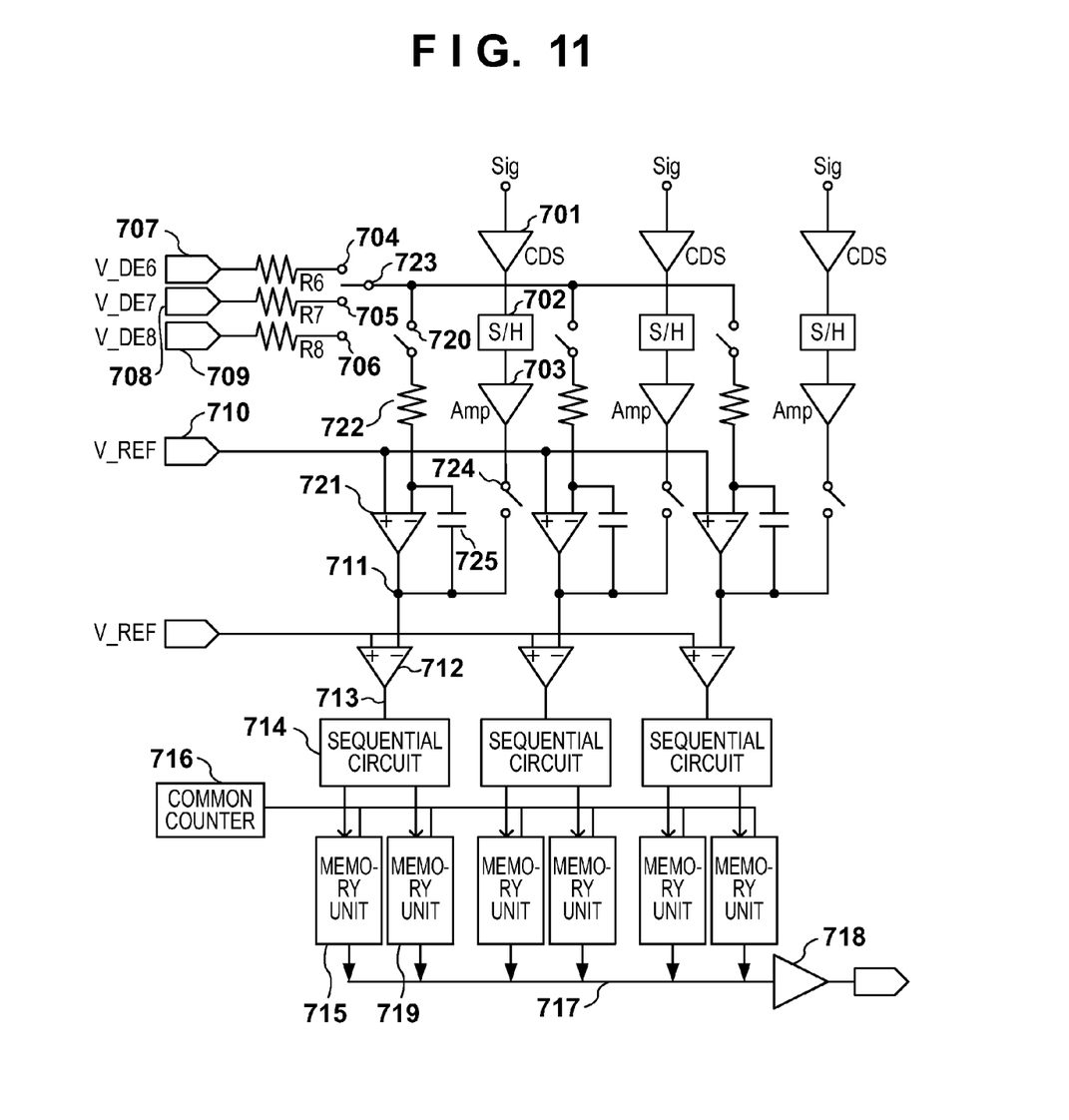
FIG. 11 is a circuit diagram showing the arrangement of an image sensor according to the third embodiment of the present invention.

An arrangement of subsequent stage of the CDS circuit of an image sensor according to the third embodiment will be described with reference to FIG. 11. Referring to FIG. 11, an output from each pixel is connected to an output terminal 711 of an integrator 721 via a CDS (correlation double sampling) circuit 701, a sample/hold (S/H) circuit 702, a column amplifier 703, and a switch 724.

By switching a switch 723, a fixed voltage V_DE6, V_DE7, or V_DE8 is applied from a terminal 704, 705, or 706 to a switch 720 via a resistance R6, R7, or R8 having a different resistance value. When the switch 720 is turned on, one of the fixed voltages V_DE6, V_DE7, and V_DE8 is applied to the input terminal (−) of the integrator 721 via one of the resistances R6 to R8 and a resistance 722. A reference voltage V_REF is applied from a terminal 710 to the other input terminal (+) of the integrator 721. The fixed voltages V_DE6 and V_DE7 are set to potentials lower than that of the reference voltage V_REF of the integrator 721, respectively. The fixed voltage V_DE8 is set to a potential higher than that of the reference voltage V_REF.

The integrator 721 has a time constant based on one of the resistances R6 to R8, the resistance 722, and a capacitor 725. A comparator 712 compares the output voltage of the output terminal 711 of the integrator 721 with the reference voltage V_REF. A trigger output 713 from the comparator 712 controls, via a sequential circuit 714, the data load timing of a memory unit 715 for holding n upper bits or a memory unit 719 for holding m lower bits. A common counter 716 is connected to the input of each memory unit. The output signals of the memory units 715 and 719 are connected to a common horizontal output line 717. The outputs of the selected memory units 715 and 719 are digitally output to the outside via an amplifier 718. As described in the first embodiment, various methods are possible as a method of selectively outputting signals from the memory units 715 and 719 to the common horizontal output line 717.

Figure 12:
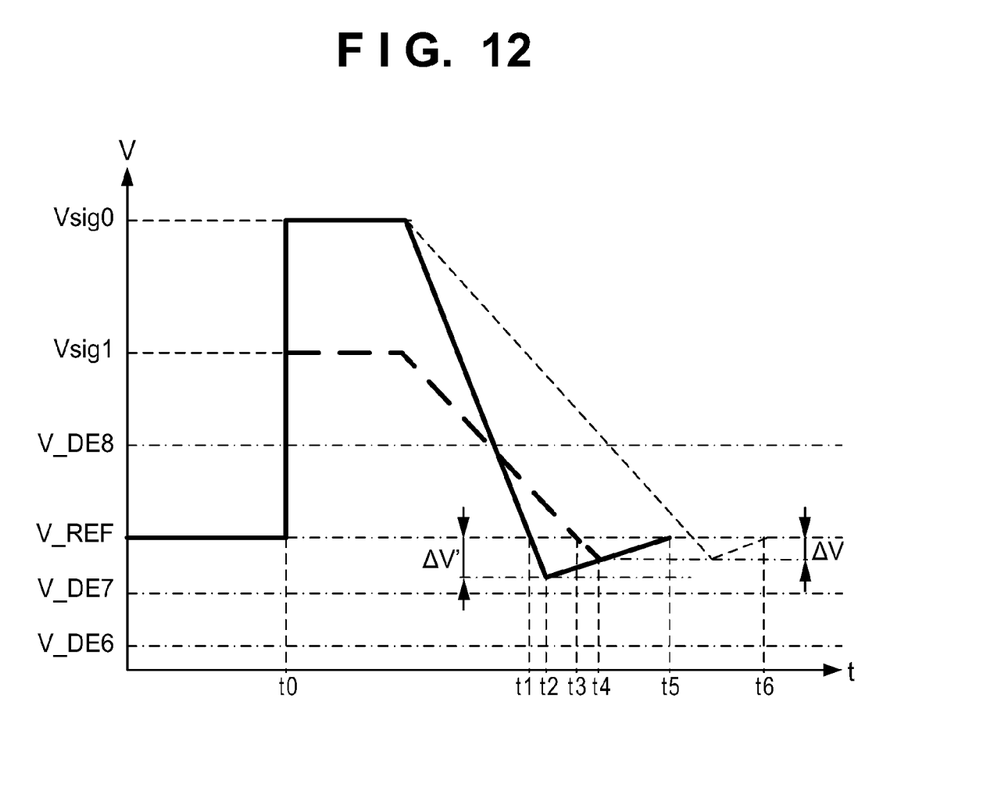
FIG. 12 is a timing chart showing an example of the operation of the image sensor according to the third embodiment of the present invention.

The operation of the circuit will be described in combination with FIG. 12. In FIG. 12, the ordinate represents the output level of the integrator and the abscissa represents time. A thick dotted line indicates an example of an operation in a mode without pixel addition. A solid line indicates an example of an operation in a two-pixel addition mode. Note that a series of A/D conversion operations in an image sensor 406 is performed based on a driving timing control signal sent from a timing generation unit 408 to the image sensor 406 according to a control signal sent from an overall control unit 410 to the timing generation unit 408.

The mode in which no pixel addition is performed will first be explained. A/D conversion is to be performed for n upper bits. The switch 724 is turned on, and the output terminal 711 of the integrator 721 is held at a signal voltage Vsig1 of the pixel at a time t0. The switch 724 is then turned off, the switch 723 selects the terminal 705, and the switch 720 is turned on, thereby applying the fixed voltage V_DE7 to the input terminal (−) of the integrator 721 via the resistance R7, switch 720, and resistance 722. Upon turning on the switch 720, the common counter 716 starts counting.

As indicated by the thick dotted line in FIG. 12, the integrator 721 starts discharge with a negative slope toward the fixed voltage V_DE7. The input (−) of the integrator becomes lower than the reference voltage V_REF at a time t3. At this time, the count value of the common counter 716 is loaded into the memory unit 715. This ends A/D conversion of the n upper bits. At the end of A/D conversion, the output of the sequential circuit 714 turns off the switch 720, thereby temporarily interrupting discharge. Since the switches are controlled in accordance with discrete times (digitally set times), discharge is actually interrupted at a time t4 after the time t3. Therefore, there is a potential difference ΔV between the output of the integrator and the compared voltage.

In the next step, conversion of m lower bits is performed by charging the potential difference ΔV by the integrator 721. More specifically, the switch 723 selects the terminal 706, and the switch 720 is turned on, thereby applying the fixed voltage V_DE8 to the integrator 721. Since the potential of the fixed voltage V_DE8 is higher than that of the reference voltage V_REF of the integrator 721, charge with a positive slope with respect to time progresses. At a time t5, the reference voltage of the comparator 712 intersects the output of the integrator 721 again, the integrator 721 generates an output, a trigger signal is sent to the memory unit 719, and the count value of the common counter 716 is loaded into the memory unit 719 for m lower bits, thereby terminating A/D conversion of ΔV. After that, the memory units 715 and 719 are sequentially selected, and upper bit signals and lower bit signals are connected to the common horizontal output line 717, and digitally output to the outside via the amplifier 718. The slope of a change amount of charge/discharge and a fixed voltage as a charge/discharge end voltage are designed according to the A/D conversion accuracy required to A/D convert ΔV.

A case in which the image sensor 406 is driven in the pixel addition readout mode will be described. By turning on transfer switches 302 of two pixels at once, the signal voltages of two PDs 301 are output. After that, the output terminal 711 of the integrator 721 is held at a signal voltage Vsig0 for two pixels by the same control as that for one pixel. In the two-pixel addition mode, the switch 723 selects the fixed voltage V_DE6 to start discharge. The output of the integrator becomes lower than the reference voltage at a time t1. At this time, the count value of the common counter 716 is loaded into the memory unit 715 for n upper bits, thereby terminating A/D conversion of the n upper bits. Since the switches are controlled in accordance with discrete times (digitally set times), A/D conversion is actually terminated at a time t2 after the time t1. The difference between the output of the integrator and the compared voltage does not become 0, and there is a potential difference ΔV' between them.

In the next step, conversion of m lower bits is performed by charging the potential difference ΔV' by the integrator 721. Similarly to the one-pixel case, the fixed voltage V_DE8 is applied to the integrator 721. Since the potential of the fixed voltage V_DE8 is higher than that of the reference voltage V_REF of the integrator 721, charge with a positive slope with respect to time progresses. At the time t5, the reference voltage of the comparator 712 intersects the output of the integrator 721 again, a trigger signal is sent to the memory unit 719, and the count value of the common counter 716 is loaded into the memory unit 719, thereby terminating A/D conversion of the m lower bits. After that, the memory units 715 and 719 are selectively connected to the common horizontal output line 717, and the count value stored in the memory unit is digitally output to the outside via the amplifier 718. The example in which discharge is performed first has been described. However, the present invention can be implemented by performing one of charge and discharge, and then performing the other one.

In the mode in which two-pixel addition is performed, if the fixed voltage V_DE7 and the resistance R7 are connected to the integrator 721, the A/D conversion end time is a time t6, similarly to the mode in which no pixel addition is performed. In this embodiment, it is possible to complete A/D conversion at the time t5 by connecting the fixed voltage V_DE6 and the resistance R6, and changing the integration time constant and the slope of a change amount of charge/discharge. The fixed voltage and resistance are selected so that the slope (a charge line drawn from the time t2 to t5 or the time t4 to t5) of the change amount of charge when A/D converting m lower bits becomes the same as that when A/D converting one pixel, even in the mode in which pixel addition is performed. This makes it possible to complete A/D conversion at high speed while maintaining the same accuracy as that in the mode without pixel addition, even if the image sensor is driven in the mode in which pixel addition is performed.

In the embodiment, conversion of N bits is divided into conversion of n upper bits and that of m lower bits wherein N=n+m. However, for example, conversion may be divided into three conversion operations including conversion of upper bits, that of middle bits, and that of lower bits where N=l+n+m. In this case, it is only necessary to add a new fixed voltage for integration, and change the fixed voltage and resistance, as needed. In the above description, conversion of the lower bits starts immediately after the end of conversion of the upper bits. However, the time required for A/D conversion varies depending on a signal voltage from a pixel. To solve this problem, it is possible to simultaneously start conversions of the lower bits of all columns by changing to conversions of the lower bits after the end of conversions of the upper bits of all the columns. As described above, according to the present invention, it is possible to realize high-accuracy, high-speed A/D conversion irrespective of a change in driving mode such as a change in number of pixel signals to be added or a change in sensitivity setting in the image capturing apparatus.

In the aforementioned first to third embodiments, noise of a pixel is removed by CDS. However, this operation may be unnecessary depending on the specifications or the type of pixel. In this case, the CDS circuit can be removed. Furthermore, there are various CDS methods, and any of them may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2012-151805, filed Jul. 5, 2012, which is hereby incorporated by reference herein in its entirety.

What is claimed is:

1. An image sensor in which a plurality of pixels are arrayed in a row direction and a column direction, and an A/D converter is provided on each column of the plurality of pixels,
wherein said A/D converter holds as an initial value which is a voltage corresponding to an output signal from a pixel or pixels of the plurality of pixels, performs one of charge and discharge from the initial value, comparing a voltage which was charged or discharged with a predetermined reference voltage, outputs, as a digital value of the output signal, a value corresponding to a time taken for the voltage which was charged or discharged to become higher or lower than the predetermined reference voltage, and changes one of an amount of charge and an amount of discharge per unit time according to a possible value of the output signal.

2. The sensor according to claim 1, wherein said A/D converter starts one of charge and discharge from the initial value, performs the other one of charge and discharge after the voltage becomes higher or lower than the reference voltage for the first time, and then further outputs, as a digital value of the output signal, a value corresponding to a time taken to become lower or higher than the reference voltage.

3. An image capturing system comprising:
an image sensor according to claim 1; and
control unit for controlling drive of said image sensor,
wherein said control unit controls drive of said image sensor so that one of an amount of charge and an amount of discharge per unit time in an A/D converter is increased as a possible maximum value of an output signal increases.

4. The system according to claim 3, wherein
a mode in which a readout operation is performed by adding pixels and a normal readout mode in which a readout operation is performed without pixel addition are provided, and
in the mode in which a readout operation is performed by adding pixels, said control unit controls so that one of the amount of charge and the amount of discharge per unit time becomes larger than that in the normal readout mode.

5. The system according to claim 3, wherein said control unit controls so that one of the amount of charge and the amount of discharge per unit time becomes larger as sensitivity of said image sensor is higher.

6. The system according to claim 3, wherein said control unit controls so that the possible maximum value of the output signal becomes smaller as a gain for amplifying an output from said image sensor is increased.

7. The system according to claim 3, wherein said control unit controls one of the amount of charge and the amount of discharge per unit time by controlling at least one of setting of one of a charge end voltage and a discharge end voltage and setting of one of a charge time constant and a discharge time constant.

8. The system according to claim 3, further comprising:
an optical system which forms an image of light on said image sensor; and
a signal processing circuit which processes an output signal from said image sensor.

* * * * *